United States Patent
Mairhofer

(10) Patent No.: US 6,684,690 B2
(45) Date of Patent: Feb. 3, 2004

(54) METHOD FOR MONITORING SLIDE BEARINGS OF A CRANK MECHANISM OF A PISTON ENGINE WITH AT LEAST ONE CYLINDER

(75) Inventor: Gerhard Mairhofer, Grünau (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 10/245,573

(22) Filed: Sep. 17, 2002

(65) Prior Publication Data

US 2003/0051537 A1 Mar. 20, 2003

(30) Foreign Application Priority Data

Sep. 19, 2001 (AT) .......................................... 1484/2001

(51) Int. Cl.[7] .............................................. G01M 15/00
(52) U.S. Cl. ...................................... 73/119 R; 73/116
(58) Field of Search ................................ 73/116; 123/48

(56) References Cited

FOREIGN PATENT DOCUMENTS

| DE | 249 075 A1 | 8/1987 |
|---|---|---|
| DE | 196 14 803 | 10/1997 |
| EP | 0 029 736 | 11/1980 |
| EP | 0 161 644 | 5/1985 |
| JP | 57 082 742 | 5/1982 |
| JP | 61 105 306 | 5/1986 |
| JP | 11 072 398 | 3/1999 |

Primary Examiner—Edward Lefkowitz
Assistant Examiner—Maurice Stevens
(74) Attorney, Agent, or Firm—Collard & Roe, P.C.

(57) ABSTRACT

A method for monitoring slide bearings (8, 10, 11) of a crank mechanism (12) of a piston engine is described, comprising at least one cylinder (1) whose piston (2) is drivably connected with a crankshaft (4) via a connecting rod (5) which is loaded alternatingly under tension and under pressure by the piston (2) in the zone of a dead center of the crank mechanism (12) depending on the cycle of the piston engine, with an operating parameter which changes on the occurrence of bearing damage being repeatedly measured and evaluated. In order to provide advantageous conditions for the method it is proposed that the piston position is measured at the dead center of the crank mechanism (12) under pressure load of the connecting rod (5) on the one hand and under tensile load of the connecting rod (5) on the other hand and the difference between the piston positions for the tensile and pressure load is evaluated.

3 Claims, 1 Drawing Sheet

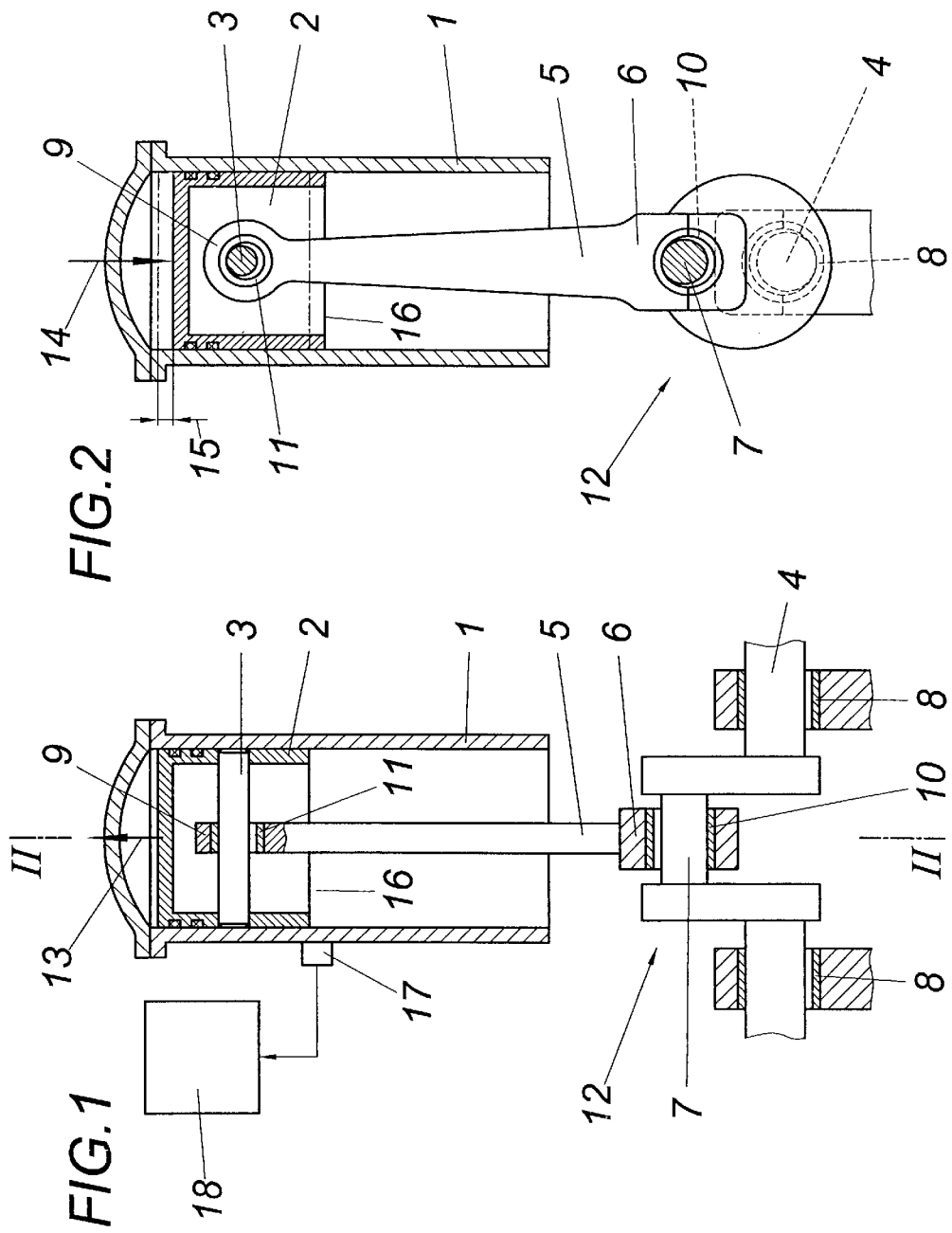

METHOD FOR MONITORING SLIDE BEARINGS OF A CRANK MECHANISM OF A PISTON ENGINE WITH AT LEAST ONE CYLINDER

FIELD OF THE INVENTION

The invention relates to a method for monitoring slide bearings of a crank mechanism of a piston engine with at least one cylinder whose piston is drivably connected with a crankshaft via a connecting rod which is loaded alternatingly under tension and under pressure by the piston in the zone of a dead center of the crank mechanism depending on the cycle of the piston engine, with an operating parameter which changes on the occurrence of bearing damage being repeatedly measured and evaluated.

DESCRIPTION OF THE PRIOR ART

Since generally any damage to slide bearings begins to show by a temperature increase in the zone of the bearing surface, it has already been proposed (EP 0161644 A2, DD 249075 A1, DE 19614803 A, JP 61105306 A) to monitor the temperature in the zone of the bearing shell during the bearing operation in order to recognize any bearing damage announced by an increase in the temperature at an early time and to enable precautions to be taken for respective countermeasures. For this purpose temperature sensors are inserted into bores of the bearing supporting body, which bores extend in part up to the bearing shell. The disadvantage in these known apparatuses for monitoring the temperature in the running layer zone is on the one hand that the bearing shells need to be tapped in order to avoid having to cope with longer response times for temperature detection which are caused by heat conduction. Despite tapping the bearing shell at several places the short response times necessary for the timely recognition of damage to the bearing is exceeded in such cases when the damage which announces itself by an increase in the temperature is situated outside of the direct measurement zones which are determined by the position of the bores for the temperature sensors. This means that the local increases in temperature in the zone of the bearing layer of a slide bearing cannot be detected in a timely fashion with the reliability demanded for the timely recognition of damage to the bearing. Similar disadvantages occur when it is not the temperature in the zone of the bearing layer but instead the lubricant pressure in the bearing clearance that is detected by way of a bore which penetrates the bearing box (JP 11072398 A) or when additional temperature sensors are provided in the zone of the measuring location for the lubricant pressure (EP 0029736 A1, JP 5782742A).

SUMMARY OF THE INVENTION

The invention is thus based on the object of monitoring the slide bearings of a crank mechanism of a piston engine with the help of a method of the kind mentioned above in such a way that in order to detect the operating parameters which change with the occurrence of a damage to the bearing it is necessary to tap neither the supporting body nor the bearing boxes of the slide bearings. Furthermore, any changes of the operating parameters which announce a damage to the bearing are to be recognized as early as possible.

The invention achieves the object in accordance with the invention in such a way that the position of at least one part of the crank mechanism, preferably the piston position, is measured at the dead center of the crank mechanism under pressure and tensile load of the connecting rod and the difference between the positions for the pressure and tensile load is evaluated.

The invention is based on the finding that the bearing surface is deformed within the terms of an increase of the bearing clearance on the one hand by the rise in temperature which occurs by the commencing fatigue of the bearing layer material and is caused by increasing metallic contacts between bearing and shaft as a result of fatigue cracks causing local deformations of the bearing surface and outbreaks of the bearing layer and on the other hand by the dynamic load. Through the progressively increasing bearing clearance it is thus possible to monitor the slide bearings with respect to an early recognition of damage under the precondition that changes of the bearing clearance can be determined in a sufficiently precise way. This is achieved in accordance with the invention in crank mechanisms of piston engines in such a way that the piston position is measured at a dead center of the crank mechanism on the one hand under the pressure load of the connecting rod and on the other hand under the tensile load of the connecting rod. If the connecting rod, in accordance with the cycle of the piston engine, is subjected in the dead center zone of the crank mechanism to a tensile load by the piston, the piston position is determined by the bearing clearances in the direction of the tensile load in addition to the occurring elastic extensions of the parts of the crank mechanism. In the case of a pressure load of the connecting rod via the piston there is an opposite limit stop of the parts at the illustrated dead center of the crank mechanism in the zone of the bearing clearances, so that the piston positions differ by the sum total of the bearing clearances on the one hand for the tensile load and on the other hand for the pressure load of the connecting rod in the illustrated dead center of the crank mechanism, which is apart from the also opposite elastic deformations of the involved parts, which allows a sufficiently precise monitoring of changes in the bearing clearance for the early recognition of damage to the bearing. Since merely the difference of the piston positions is detected, any heat-induced expansions of the parts of the crank mechanism have no influence on the precision of the detection of the bearing clearance. It is understood that also the connecting rod position or the position of the crankshaft can be detected in the respective dead center of the crank mechanism when only the bearings of the con-rod head and the crankshaft or only the crankshaft bearings are to be monitored.

The measurement of the piston positions or the positions of the respectively detected part of the crank mechanism at the dead center of the crank mechanism is preferably made in a contactless fashion. For the purpose of determining the position (like the detection of the position for other parts of the crank mechanism), different reference variables can be used because merely the position with respect to the cylinder or the crankcase is relevant. Particularly simple constructional conditions are obtained, however, when the face side of the piston on the con-rod side is used.

BRIEF DESCRIPTION OF THE DRAWINGS

The method in accordance with the invention is explained in closer detail by reference to the enclosed drawing, wherein:

FIG. 1 shows the crank mechanism of a piston engine in a dead center position of the tension-loaded connecting rod in a schematic longitudinal sectional view, and FIG. 2 shows a sectional view along line II—II of FIG. 1, but in a dead center position for the pressure-loaded connecting rod.

DESCRIPTION OF THE PREFERRED EMBODIMENT

A schematically indicated piston engine such as a four-stroke internal combustion engine shows a cylinder 1 with a piston 2 whose piston pin is designated with reference numeral 3. A connecting rod 5 is held between the piston pin 3 and the crankshaft 4, with the head 6 of the connecting rod being held on the crank pin 7 of the crankshaft 4. The crankshaft 4 is held in a crankcase (not shown in closer detail) via slide bearings 8. Slide bearings 10 and 11 are also provided for holding the head 6 of the connecting rod on the crank pin 7 or the con-rod eye 9 on the piston pin 3. For the purpose of better illustration of the circumstances relevant for the invention, the bearings clearances of the slide bearings 8, 10 and 11 are shown in a strongly enlarged manner, namely at the upper dead center position of the crank mechanism 12 obtained by the crankshaft 4 and the connecting rod 5.

FIG. 1 shows the piston position at the upper dead center of the crank mechanism 12 during the exchange of gas of a four-stroke internal combustion engine. Due to the inertia forces, the connecting rod 5 is loaded in a tensile fashion via the piston 2, as is indicated by arrow 13 in FIG. 1. This means that the bearing clearances of the slide bearings 8, 10 and 11 added up in the direction of the arrow 13, so that the piston 2 assumes its highest position with respect to cylinder 1, since the elastic deformations of connecting rod 5 and the crankshaft 4 also produce a displacement of the piston in the direction of arrow 13, which was not considered in the drawing, however.

If the gas mixture is ignited in the cylinder 1 in the upper dead center position of the crank mechanism 12, the piston 2 is loaded in the direction of arrow 14 according to FIG. 2, which leads to a pressure load of the connecting rod 5 with the effect that the slide bearings 8, 10 and 11 are loaded in the opposite sense and the bearing clearances add up within the terms of a shortening of the drive train, which leads to the lowermost piston position in the zone of the upper dead center of the crank mechanism 12 due to the also occurring elastic deformations in the opposite sense. Apart from the elastic deformations which are obtained especially by the extension and compression of the connecting rod 5 as well as the deflection of the crankshaft 4, the difference 15 between the piston position for the tensile load as indicated with the dot-dash line in FIG. 2 and the piston position for the pressure load of connecting rod 5 as shown with the unbroken line is determined substantially by the sum total of all bearing clearances. If in the zone of one of the slide bearings 8, 10, 11 a progressive increase in the bearing play occurs which is caused by the fatigue of the bearing material, this change of the bearing play of one of the slide bearings 8, 10, 11 will become noticeable in an increase of the piston positions for the tensile and pressure load, which creates an important precondition for a secure timely recognition of damage. In order to monitor the slide bearings 8, 10 and 11 it is therefore merely necessary to detect the piston position in the upper dead center of the crank mechanism 12, such that the position of the face side 16 on the side of the connecting rod is detected via a contactless operating positional sensor 17 and is supplied to an evaluation circuit 18, as is indicated in FIG. 1.

What is claimed is:

1. A method of monitoring slide bearings of a crank mechanism of a piston engine with at least one cylinder whose piston is drivably connected with a crankshaft by a connecting rod which is alternately loaded by the piston under tension and under pressure at a respective one of two dead centers of the crank mechanism, depending on the cycle of the piston engine, which comprises the steps of
repeatedly measuring the position of at least one part of the crank mechanism at a selected one of the dead centers of the crank mechanism under pressure load of the connecting rod, on the one hand, and under tensile load of the connecting rod, on the other hand, and
evaluating the difference between the measured positions for the pressure and tensile load.

2. The method of claim 1, wherein the part of the crank mechanism whose position is repeatedly measured is the piston.

3. The method of claim 2, wherein the piston position is measured at at a side of the piston facing the connecting rod.

* * * * *